United States Patent [19]

Lenz

[11] Patent Number: 4,496,139
[45] Date of Patent: Jan. 29, 1985

[54] VISE CLAMP AND SWIVEL BASE VISE USING SUCH CLAMP

[75] Inventor: John O. Lenz, Coon Rapids, Minn.

[73] Assignee: Kurt Manufacturing Company, Inc., Minneapolis, Minn.

[21] Appl. No.: 508,340

[22] Filed: Jun. 27, 1983

Related U.S. Application Data

[62] Division of Ser. No. 252,286, Apr. 9, 1981, Pat. No. 4,413,819.

[51] Int. Cl.³ .............................................. B23Q 3/02
[52] U.S. Cl. ..................................... 269/81; 269/82; 269/99; 269/93; 269/94
[58] Field of Search ............................ 269/95, 97–100, 269/237, 238, 91–94, 81–85, 57, 63; 51/217 R; 29/1 A; 409/903; 198/345

[56] References Cited

U.S. PATENT DOCUMENTS

| 602,381 | 4/1898 | White et al. ........................ 269/94 |
| 1,284,124 | 11/1918 | Mazier ................................. 269/92 |
| 1,820,667 | 8/1931 | Leyes . | |
| 2,320,805 | 6/1943 | Smith .................................. 269/94 |
| 2,755,758 | 7/1956 | Johansen ............................. 269/94 |
| 2,764,380 | 9/1956 | Gumphrey .......................... 269/82 |
| 2,872,854 | 2/1959 | Chow .................................. 269/94 |
| 2,994,236 | 8/1961 | McCormick . | |
| 3,002,745 | 10/1961 | Via . | |
| 3,397,879 | 8/1968 | Morawski et al. . | |
| 3,571,872 | 3/1971 | Kieboom ........................... 198/345 |
| 3,724,837 | 4/1973 | McPherson . | |
| 3,865,360 | 2/1975 | Schweidler ......................... 269/81 |
| 3,958,335 | 5/1976 | Arnold et al. ...................... 269/81 |

FOREIGN PATENT DOCUMENTS

| 218672 | 3/1958 | Australia ............................. 269/94 |
| 1370579 | 7/1964 | France ................................. 269/94 |
| 535283 | 4/1941 | United Kingdom ................ 269/93 |
| 1430762 | 4/1976 | United Kingdom ................ 269/94 |
| 686846 | 9/1979 | U.S.S.R. .............................. 269/94 |

Primary Examiner—Robert C. Watson
Attorney, Agent, or Firm—Kinney & Lange

[57] ABSTRACT

A vise clamp has an elongated body which fits into a T-shaped slot of a tool table. The body has a head at one end which extends out of the slot and pair of pivotal lugs which fit under the side shoulder of the slot. Means are provided to provide a pivoting action which tends to pivot the head toward the table surface to tend to clamp a tool such as a vise against the table. The major portion of the clamp thus remains recessed below the table surface. The clamp permits making a low profile swivel base vise that has the clamps positioned below the vise base and yet they are easily operated.

18 Claims, 13 Drawing Figures

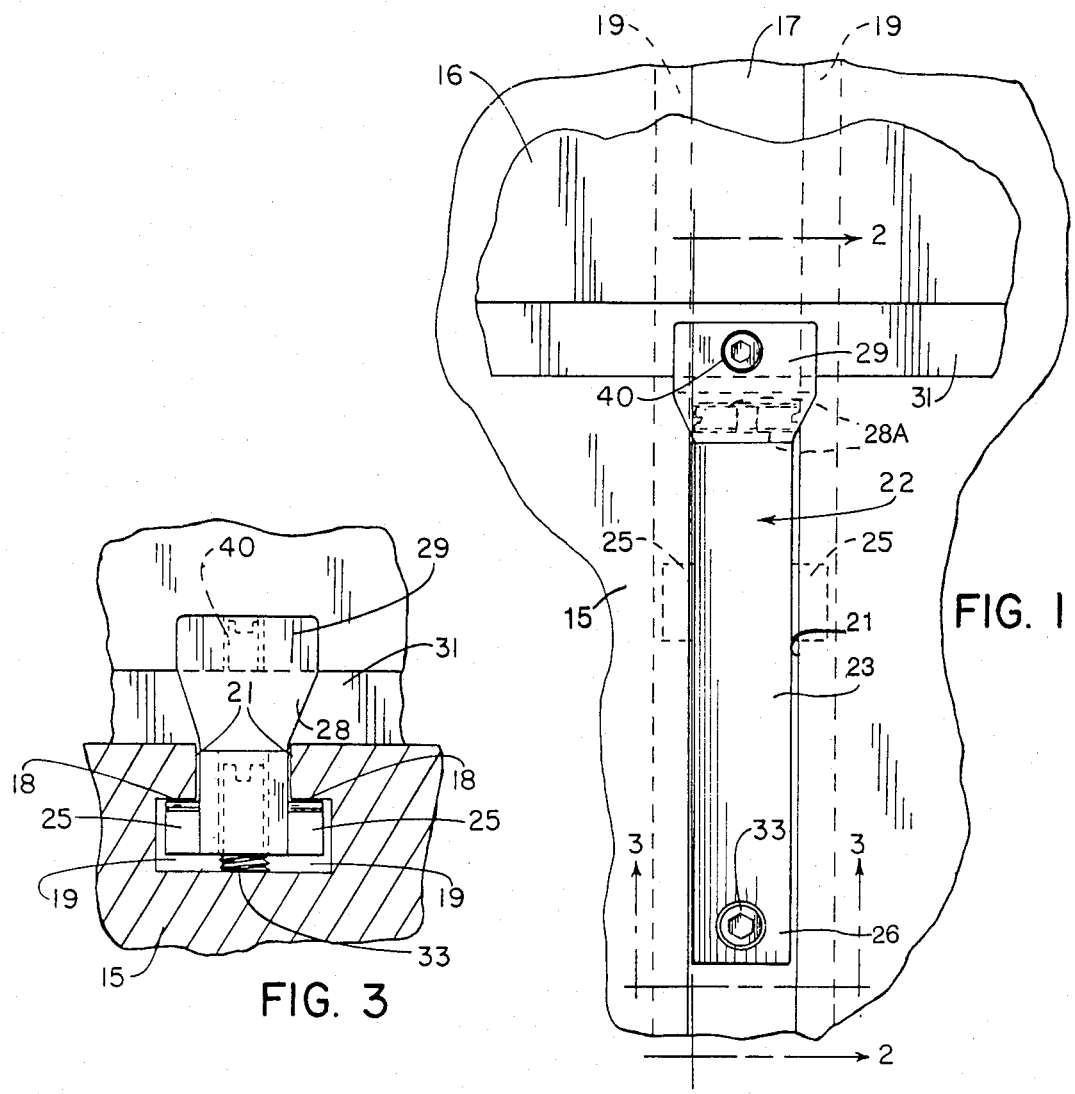
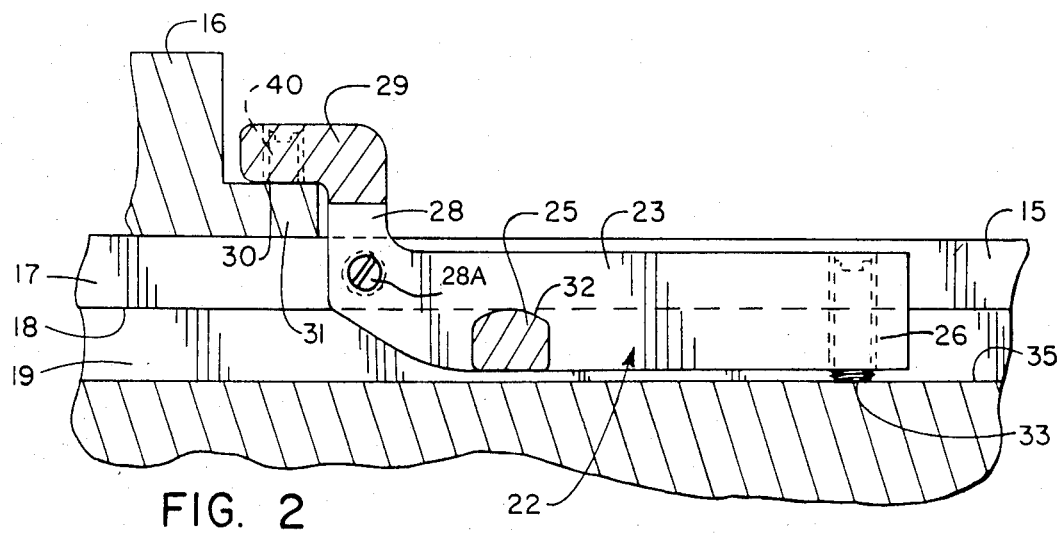

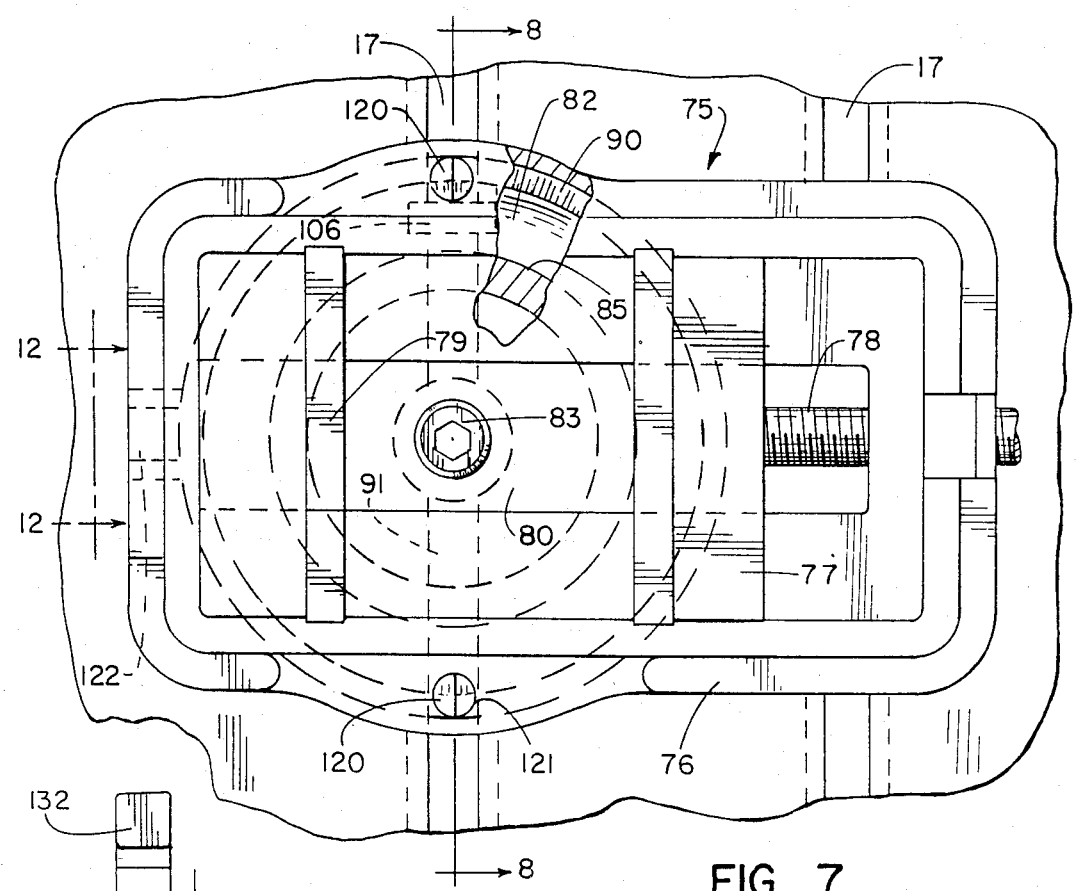
FIG. 7
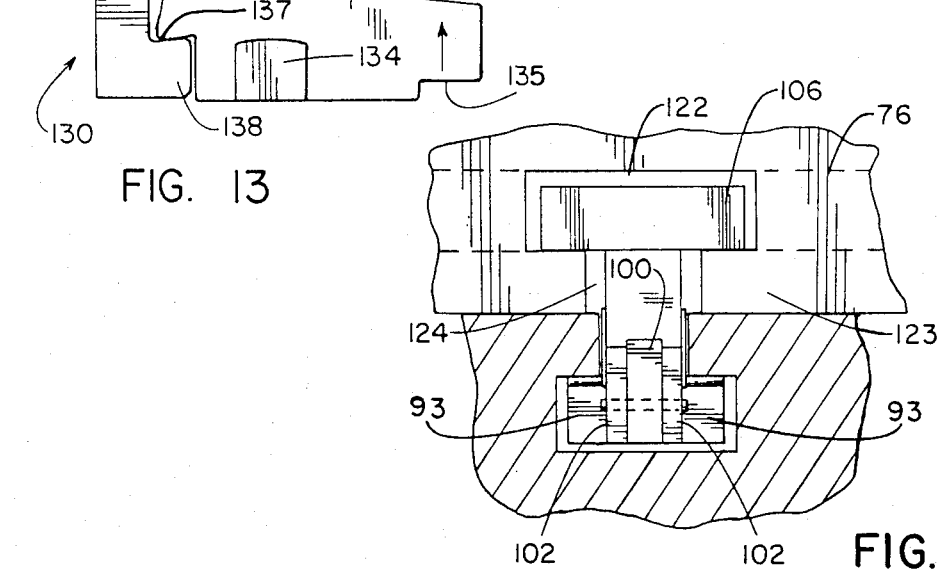
FIG. 13
FIG. 12

4,496,139

VISE CLAMP AND SWIVEL BASE VISE USING SUCH CLAMP

This is a division of application Ser. No. 252,286, filed Apr. 9, 1981, now U.S. Pat. No. 4,413,819.

BACKGROUND OF THE INVENTION

1. Field of the Invention

The present invention relates to clamps that can be used for clamping vises or other tools onto machine tables and such clamps used in combination with a unique swivel base vise.

2. Description of the Prior Art

Various types of vises have been advanced over the years; clamps for holding such vises relative to tool tables also have been utilized. Clamps which extend above the table surface has been a problem because they tend to take up space and interfere with the other operations of the tool table. For example, U.S. Pat. No. 3,397,879 shows such a clamp, but it is not a high force clamp that fits into the T-slot of a table with the major portion of the clamp recessed below the table top.

U.S. Pat. No. 3,724,837 shows a retracting clamp for holding work pieces on the bed of a machine tool, but the clamp itself has to be attached to the base of a machine tool through holes that are provided in the flanges.

U.S. Pat. No. 1,820,667 shows a T-bolt clamp of conventional form where the T-head fits into a T-slot. U.S. Pat. No. 2,994,236 shows a type of a pivoting clamp that utilizes two members providing a hold-down pivoting action. The clamp of U.S. Pat. No. 2,994,236 is positioned above the table surface.

U.S. Pat. No. 3,002,745 shows a type of an automobile engine lift with a pivoting clamp lever that goes into working position as shown on FIG. 3 of the drawings to clamp against the front cross member of an automobile frame when the engine is being lifted. However, a locking hole has to be used for holding the clamp in position, and this type of clamp is not readily useable on a machine tool table.

SUMMARY OF THE INVENTION

The present invention relates to a clamp for holding vises or similar objects relative to a tool table while the major portion of the clamp, except for a small clamping head member, remains recessed below the level of the table.

The clamp comprises an elongated body that has pivot lugs that fit under the shoulders within the ordinary T-slot of a machine tool table. The body fits below the table top, within the slot, and at one end there is a clamping head which extends upwardly out of the T-slot to position above the table. The opposite end of the body extends in opposite direction from the head beyond the pivot lugs. Means are provided to tend to pivot the opposite end of the body upwardly which therefore pivots the head downwardly. The head has a clamp shoulder surface which faces the table surface and is moved with a mechanical force toward the table to clamp objects that are positioned under the shoulder surface of the head.

As shown, a screw provides the mechanical force for clamping, and in one form of the invention, the main body extends in a direction away from the vise which is to be clamped with the clamping screw threaded into the body itself.

A swivel based vise combination using the clamp has a clamping screw accessible from the top, above the center portions of the vise. The clamping screw clamps a pair of pivoting clamps against an internal flange of the swivel base. The combination results in a very low profile swivel base vise utilizing the clamps, which provide a high clamping force.

By properly locating and shaping the clamping head, the clamps can also be utilized for NC-type vises. The clamp for NC vises is made so it does not protrude laterally out beyond the edges of such vises. This permits the vises to be positioned side by side on the machine tool table.

Variations of the clamp can be made to increase the force multiplication or leverage by having the head member pivotally mounted to the elongated body.

The force normally is applied by urging the remote end of the clamp body upwardly so that the head (at the opposite end of the body) pivots downwardly toward the table surface (the head extends up through the slot) as it rocks about the pivot lugs on the body. This downward force can be provided with suitable screws. The clamps are recessed in the slots, so they may be positioned underneath the vise being clamped. The clamp screw can extend up through the body of the vise and be accessible to the operator.

The clamps for a low-profile swivel base are utilized for holding a reference angle indicator plate in position. The angle indicator plate has an annular flange forming the rotating center for the vise to precisely hold the vise about a known rotational axis relative to the center of the table slot in which the clamps are positioned. The clamps fit underneath the vise, so they are completely recessed and clamp around an inturned annular ledge of flange when actuated to securely hold a vise in any desired position. The overall height of the swivel base vise is substantially reduced from those normally being used and accuracy is not sacrificed.

BRIEF DESCRIPTION OF THE DRAWINGS

FIG. 1 is a top plan view of a vise clamp made according to the present invention;

FIG. 2 is a view taken generally along line 2—2 in FIG. 1;

FIG. 3 is a sectional view taken as on line 3—3 in FIG. 1;

FIG. 7 is a part schematic top plan view of a swivel base vise shown installed in a tool table, and having a clamping arrangement made according to the present invention installed therein;

FIG. 12 is a fragmentary sectional view taken as on line 12—12 in FIG. 7; and

FIG. 13 is a side view of a further modified two part clamp.

DESCRIPTION OF THE PREFERRED EMBODIMENTS

Figure 4:
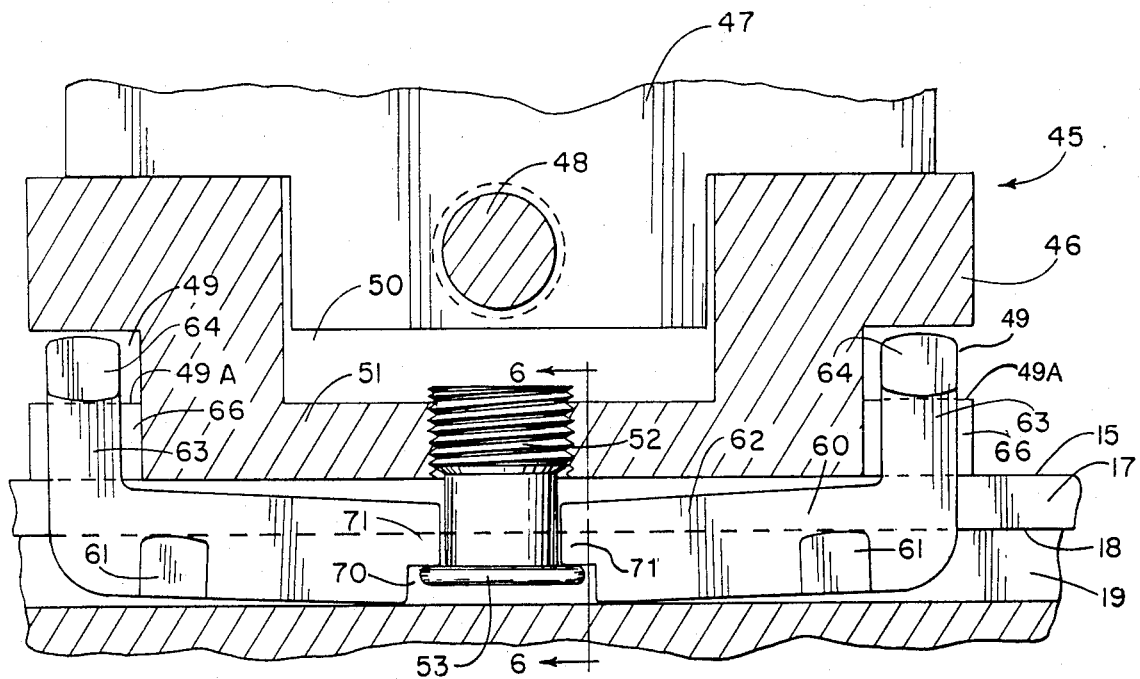
FIG. 4 is a view taken generally along the line 4—4 in FIG. 5, showing a modified clamping arrangement using clamps according to the present invention.

FIGS. 1, 2 and 3 show a basic form of the vise clamp of the present invention that can be used with any type of vise or work holder that is to be positively clamped to a slotted tool table.

A tool table 15 of conventional design has a vise shown fragmentarily at 16 mounted thereon for use with a machine tool above the table. As is common, the tool table has a plurality of slots 17 extending along its length. Each slot 17 is an inverted T shape slot having shoulder portions defining a slot opening between surfaces 21, 21 and which form interior shoulder surfaces indicated at 18, 18 in FIG. 3 which define a "head" of the T-slot. The shoulders form underlying side receptacles 19,19.

The vise clamp made according to the present invention is shown generally at 22 and has a narrow elongated body 23 that fits within the opening of the slot 17, that is between the surfaces 21,21 of the slot. A pair of pivot lugs 25,25 are fixed to the body and extend laterally out from the main body 23 at a position, as shown, approximately one-third of the distance between the opposite ends of the elongated body 23. The first end of the elongated body 23 has an integral neck portion 28 which extends upwardly from the main body portion, between surfaces 21 and above the level of the table 15. A clamping head 29 is mounted on the upper end of the neck. The neck tapers outwardly above the table as the head is wider than slot 17. The head has a lip forming a clamping face 30 projecting out from the neck and facing the tool table surface 15. The clamping face 30 thus is a downwardly facing surface that is designed to overlie a flange 31 formed along the side edge of a vise or other member 16 that is to be held.

The pivot lugs 25A, are much like wing members and they extend laterally out from the main body 23 into the receptacles 19,19 below shoulder surfaces 18 and have upper rounded pivot surfaces indicated at 32 which rest against the shoulder surfaces 18 when the clamp is in use. The remote end 26 of the body 23 (the opposite end from the head) has a clamping screw 33 threadably mounted therein, as shown. The screw has a socket head so that the end of the screw 33 can be tightened down against the lower surface 35 of the slot 17, and this will in turn tend to lift the remote end 26 of the body upwardly.

At the same time, because the pivot lugs 25 rest on their upper surface 32, the body will tend to pivot and urge the clamping surface 30 toward the surface of the tool table. When a flange 31 is positioned under the clamping surface (or with the surface 30 positioned over a flange), a clamping force will be exerted by the surface 30 tending to clamp the vise or other member 16 downwardly against the upper surface of the table 15.

Thus, a direct mechanical advantage is obtained because of the location of the pivot lugs 25 relative to the surface 30 and the clamping screw 33.

Additionally, a lock screw 40 can be threadably mounted in the outwardly extending lip portion of the head 25. The screw 40 extends down through the surface 30 and engages the upper surface of the flange 31. If small recesses were made in the flange 31, the screw 40 could positively locate a vise or other member 16 in a desired manner.

Additionally, note that the upper surface of body 23 is recessed below the upper surface of the table 15, as shown in FIG. 2, and only the neck portion 28 and the head 29 extend upwardly above this surface. This means that additional members can be placed on the table 15 overlying the body 23 of the vise clamp 22. This is particularly important where there are multiple vises or multiple work holding members on the same tool table.

A suitable wrench can be used for tightening the screw 33 while the screw remains below the support surface of the table 15.

The force amplification can be adjusted by changing the lever arm between the surface 30 and the pivot lugs relative to lever arm length between the pivot lugs and the locking screw 33. The head member 29 flares laterally outwardly above the table. The neck 28 is narrow so that it will pass through the table slot and permit clamping movement. The neck may have a lateral threaded hole with a pair of self-locking set screws 28A mounted in alignment with the opening of slot 17, which can be adjusted to accomodate different widths of slots. The heads of the set screws will bear on the slot side surfaces and center the clamp.

Figure 5:
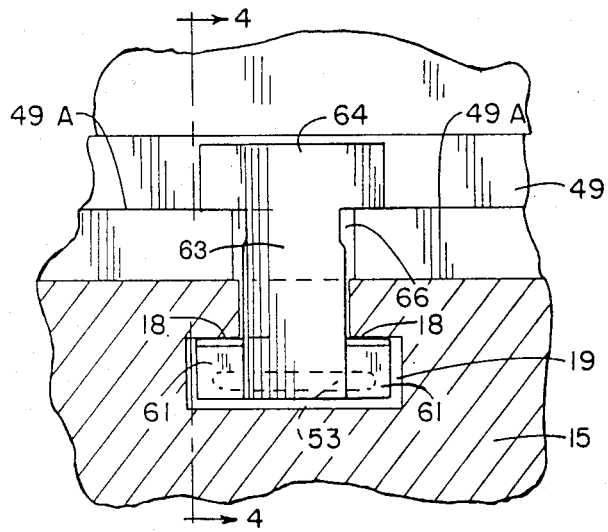
FIG. 5 is a fragmentary side elevational view of device of FIG. 4.
Figure 6:
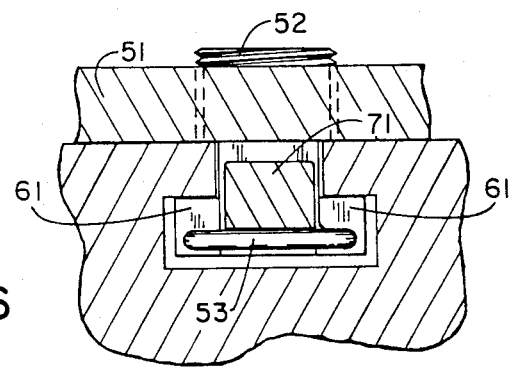
FIG. 6 is a fragmentary sectional view taken as on line 6—6 in FIG. 4.

A modified form of the invention is shown in FIGS. 4, 5 and 6, which comprises what is normally termed an "NC" vise. The ability to place such a vise very close to another vise in a numeric controlled machine tool is essential. The NC vises normally have vise bodies with longitudinal slots milled into the opposite parallel sides thereof, and with parallel surfaces on the opposite sides. Clamps for holding NC vises on the table have been a limiting factor on how close the vises can be placed together, and with clamps utilized in accordance with the present invention, NC vise bodies can be placed substantially abutting or contiguous to each other in side by side relationship for numeric controlled machine work. This minimizes the center-to-center machining distance, and while vises which can be placed side by side and clamped onto a machine tool table have been made, the clamps have to be positioned other than at a location directly adjacent to or close to the clamping jaws of the vise. If the clamps can be placed very close to the vise clamping jaws, the possibility of vise deflection causing any problems is minimized.

FIG. 4 is a part schematic sectional view taken across a typical NC vise, and shows the vise indicated generally at 45 as having a vise body 46, and a movable jaw 47. The jaw 47 is moved with the vise screw 48 in the normal manner, along the guides on the body. The vise body has a pair of longitudinally extending exterior grooves 49 along the opposite sides thereof.

The table 15 again is shown with the slot 17, and which has shoulder surfaces 18, and undercut or recess portions 19 to form the inverted T shaped slot that is common in tool tables.

In this form of the invention, the vise body 46 has a recess 50 in the center portions thereof to mount the movable jaw 47, and the lower wall 51 of the vise body has a threaded opening which receives a threaded lock screw or clamp screw 52. The clamp screw 52 has a head 53 which extends downwardly through the opening in the vise body 46. The head and a shank portion of the screw 52 extends into the slot 17 of the table 15, and it can be seen that in installation the vise body has to be positioned so that the head of the screw 52 can slide into the slot 17.

In this form of the invention, a pair of clamps 60 are utilized, and as can be seen the clamps fit into the slot 17 and these clamps have pivot or rocker lugs 61 on opposite sides of a vise clamp body 62. The body 62 is elongated, as shown (it has a longitudinal axis parallel to the slot longitudinal axis), and has a neck portion 63 that is of size to fit through the opening of the slot 17. The neck 63 in turn supports a clamping head 64 which forms a T section with the neck 63, as can be seen in FIG. 5, for example. The head 64 has ends that extend laterally outwardly beyond the sides of the neck 63, as shown. The neck 63 of each clamp also passes upwardly through (fits into) a provided upright slot 66 which is formed in the side of the vise body 46 and opens to the slot 49.

As can be seen in FIG. 5, the neck 63 extends upwardly from the table 17 through the respective slot 66 on the vise, so that the head 64 of each clamp is positioned in the associated slot 49 and the side portions of the head 64 overlap and clamp against the lower surface 49A of the slot 49. The opposite end of the body 62 from the head 63 of the two clamp members, as shown in FIG. 4, have a notch 70 formed in the lower side of each of the body members. The notch provides a lug portion 71 that forms an overhanging shoulder surface that fits over the head 53 of the screw 52, when the vise and clamps are positioned on a table.

The pivot lugs 61 are suitably located to provide the desired amount of mechanical advantage in the clamping members 60. Upon tightening the screw with a suitable wrench (which can be an Allen wrench or the like) the head of the screw 52 is pulled up toward the vise base. The head 53 engages the lugs 71, and pulls the inner ends of the clamps (remote from the heads) upwardly so that the pivot lugs 61 will cause the respective clamps to rock or pivot. The heads 64 will then be caused to bear down against the surfaces 49A to clamp the vise body 46 tightly against the top of the table 17. A single screw tightens the vice down.

The screw 52 will urge both of the clamps to tighten so that the heads 64 and the ears on the outer ends of the heads will push down on the surfaces 49A to clamp the vise against the table. As the screw 52 pulls upwardly on the remote ends of the clamps, it also pulls the vise body 46 down against the table. The clamps amplify the force from the screw, and upward force from the screw is converted into a downward pulling force in the vise body. A two thousand pound upward force on the screw 52 would result in almost five thousand pounds of force holding the vise body on the machine table, in that the force of the screw directly would be one force, and then the multiplied force at each of the clamp heads would be added to that amount.

The ability to utilize the vise clamp of the present invention in relation to a swivel base vise makes the swivel base vise much more stable and sturdy in that the vise jaws may be kept close to the table top, and the rotating base mechanism normally added to the vise can be made integral with the vise. The clamps of the present invention are underneath the vise itself. The vise is more stable because the previous need for a separate swivel base which raises the height of the jaws from the tool table surface is eliminated.

FIGS. 7 through 12 illustrate the preferred embodiment of the swivel base vise using the vise clamp made according to the present invention. It also shows a variation of the vise clamp itself that helps to increase the force amplification of the vise clamp.

Referring in particular to FIG. 7, a swivel base vise indicated generally at 75, has a vise body 76, and a movable jaw 77 actuated by a screw 78 which is only schematically shown.

A stationary jaw 79 is mounted on the vise body in a normal manner and the movable jaw 77 is moved toward and away from the stationary jaw for clamping work pieces. The center portion of the vise body has a recess 80, forming a center base or bottom wall 81. The edge configuration of the vise can be as desired, and the vise body can be cast as one piece.

Figure 8:
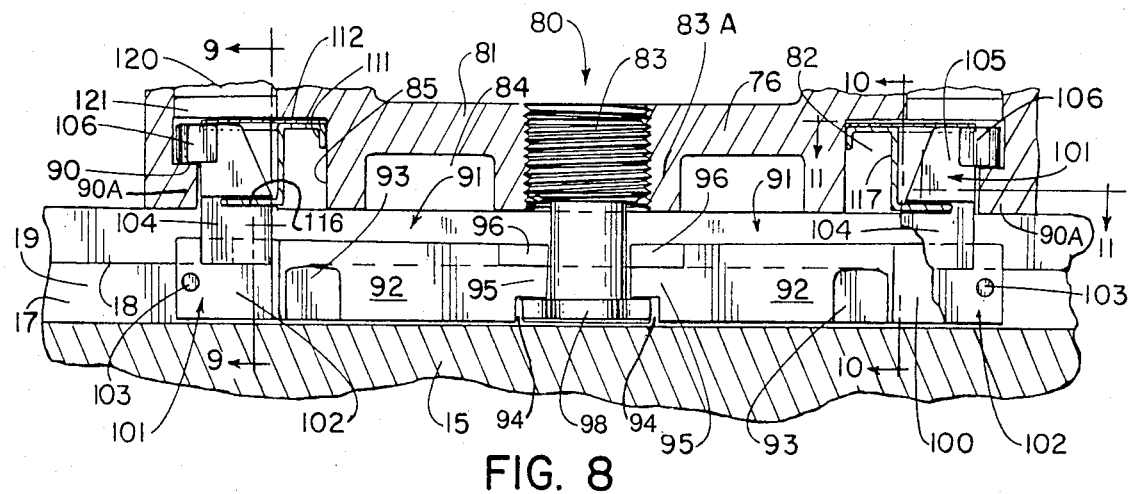
FIG. 8 is a fragmentary sectional view taken as on line 8—8 in FIG. 7, also showing a modified clamp construction.

The vise body is cast, as can be seen in FIG. 8, with an outer annular downwardly opening recess 82 which is closely spaced from the sides of the vise body. The recess 82 is centered on the axis of a central opening in wall 81 in which a mounting screw 83 is threaded. Note that a suitable downwardly opening recess 84 also can be provided around the upright axis of the vise body (the axis of screw 83). A wall 83A forms a boss around the screw 83 so that adequate thread depth can be obtained for the screw 83. The annular recess 82 is formed by an accurately machined upright cylindrical surface 85 formed around the axis of the vise (and screw 83). This surface 85 is used for locating a dial plate that indicates the rotation of the vise from a reference position. The outer periphery of the recess 82 includes an annular recess portion forming a shoulder surface 90 that is the upper surfaces of a flange portion 90A that extends annularly around the outer periphery of the recess 82.

The table 15 shown in FIGS. 7 through 12 is also provided with a slot 17, having undercut shoulder surfaces 18, formed by recesses 19 to form an inverted T shaped slot as previously explained. In combination with the swivel vise base, a pair of clamp members made according to the present invention and illustrated at 91 are provided in the slot. In this particular form of the invention, the clamping members 91 have elongated bodies 92, each having a pair of pivot lugs 93 fixed thereto on opposite sides as in the previous forms of the invention. One end of the body 92 (the remote end) is provided with a notch 94 forming a clamping lug 95 that cooperates with a flange or head 98 of the screw 83, and overlies the head 98. The head 98 has its edges in the notches 94 and underneath the lugs 95. Additionally, the body 92 as shown is provided on each side thereof with a ground raised boss surface portion 96 on each side of the body. The bosses are precisely ground so that the width of the body 92 in the areas shown at 96 very closely fits between the surfaces 21 forming the opening of the slot 17 at the top of the table 15. In FIG. 8 it can be seen that the ground areas 96 are in line with the surfaces 21 defining the slots. This means that the bodies 92 tightly fit into the table slots, and do not move or shift from side to side.

Figure 9:
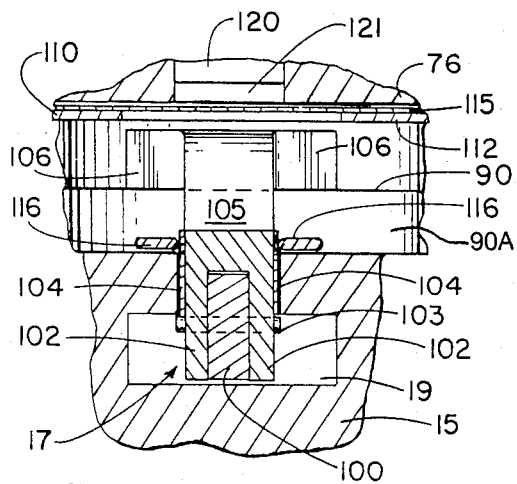
FIG. 9 is a sectional view taken as along line 9—9 in FIG. 8.
Figure 10:
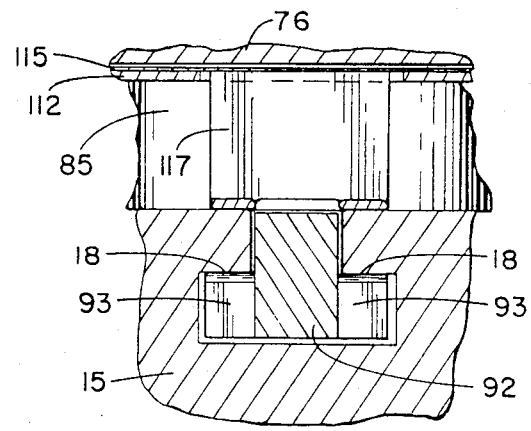
FIG. 10 is a sectional view taken as along line 10—10 in FIG. 8.

The head ends of the bodies 92 in this form of the invention have a narrowed down tang portion 100 on which a clamp neck and head indicated at 101 is pivotally mounted. The clamp members 91 are made in two parts. The clamp head 101 has a pair of side flanges 102, 102 (see FIG. 9) which fit over the tang portion 100 at the head end of the clamp and the flanges are pivotally mounted to the tang with a pin 103. The clamp heads have side pads 104 which have ground surfaces that fit precisely within the slots 17, just as the portions 96 on the body members 92. The clamp heads include neck portions 105 which extend upwardly through the slot 17, and the neck portions in turn support a clamp head including ears 106 which extend laterally on either side of the neck portions as seen in FIG. 9 and serve to provide for clamping force across the width of the clamp head against surfaces 90 when the clamps are actuated.

The cylindrical boss surface 85 is used for precisely locating a dial assembly 110, which has a formed annular flange 111 that fits tightly around the surface 85. The surface 85 is a guide surface defining the axis of rotation of the vise body in cooperation with the flange 111. The dial assembly includes a horizontal dial plate section 112 that forms an annular plate around the surface 85 and is positioned within the recess 82.

The dial plate 112 is for supporting a plastic or engraved metal annular protractor dial face sheet 115 that is adhesively fastened to the annular dial plate 112, and which is oriented in a proper relationship to the locating or reference sections of the protractor dial assembly 110.

Figure 11:
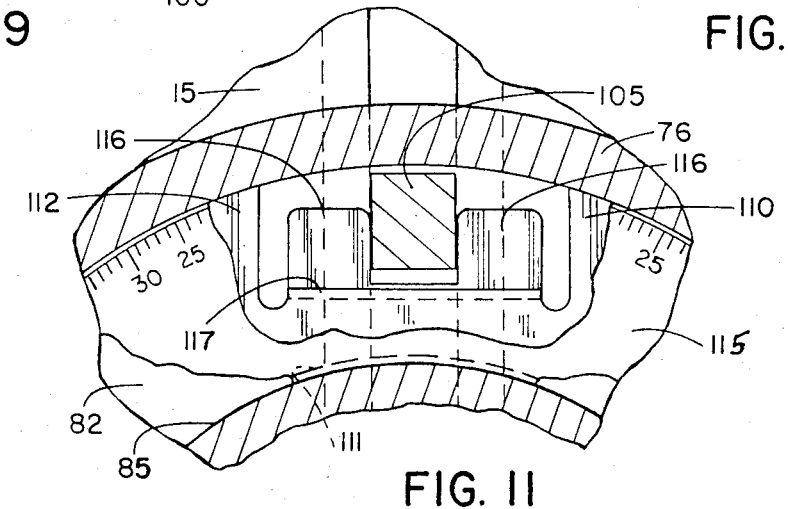
FIG. 11 is a fragmentary view taken as on line 11—11 in FIG. 8 with parts broken away.

Centered at each 90° line, the annular plate 112 is formed downwardly as shown in FIG. 11, and a pair of spaced feet or tabs 116, 116 are also formed. The tabs 116 are supported below the plate 112 by a vertical leg section 117, which can be seen in FIG. 10 as well. The tabs 116, 116 of each pair are spaced apart a very precise distance and they will fit tightly over the ground surface pads 104 on the neck 105 which extend up through the slot 17 in the table 15.

As shown, the tabs or feet 116 are positioned every ninety degrees and in use the sets of tabs one hundred and eighty degrees apart are used. The slots defined by the sets of tabs ninety degrees from those shown may be different width from the other sets. This permits use of the same dial assembly on ⅝ inch wide clamps or 11/16 inch wide clamps by using the two sets of tabs.

The vise base overlies both of the clamps 91,91 so that when the clamp members are positioned in a table slot the necks 105 extend up into the recess 82, and with the clamp head ears 106 overlying the shoulder surface 90, the scale holder or dial plate 112 and the protractor scale 115 will be held very precisely relative to the clamps in a precise reference position. When the clamps are loosened the vise can be rotated around the axis of the screw 83 while the clamps and the dial assembly 110 remain stationary relative to the table. The flange 111 forms a guide means for the vise body as the vise body is rotated on the table.

As shown in FIG. 7, on opposite sides of the vise body there are two clear lenses 120,120 in provided openings 121 aligned with the protractor scale 115. Each of these lenses can have a reference line as shown therein scribed on it, to provide for a zero or 90° position reading on the underlying angle markings on sheet 115 at a reference position. Then, when the vise is rotated about the axis of the screw 83 and the dial assembly 110, including dial plate 112 is held by the clamps relative to the table 15. The amount of rotation of the vise relative to the reference position will be indicated by a line or bullseye reference in the lenses 120,120. The reference position may be either a "zero", which would indicate that the plane of the vise jaws was parallel to the axis of the table slot 17, or the reference position could be a ninety degree position from that.

As shown in FIG. 12, the vise base 76 has an access slot 122 so that the clamp member ears 106 can be inserted into position underneath the vise for assembly. The clamps can be slid into position through the slot 122.

To set up the vise, one manually turns the dial assembly 110 so that the properly spaced tabs line up with the T shaped opening 122 in the vise body. Next, the vise is slid onto the machine table and the bottom of screw 83 is entered into the desired table T slot.

The slot 122 in the end of the vise body is then lined up with the table T slot and one of the clamps 91 is pushed through the slot 122 and into slot 17 until it bottoms against the stem of screw 83. This first clamp has now keyed the dial assembly 110 so that the reference position is exactly lined up with the table T slot.

Next, the vise body is rotated one hundred eighty degrees on the machine table so that slot 122 again lines up with the table T slot and the other clamp 91 is inserted into the same slot and through slot 122. The vise can now be rotated to the position desired. Only one screw 83 needs to be tightened to lock the vise in place.

It should be noted in FIG. 12, that even if the clamps are directly aligned with the access slot 122, the ears 106 are made so that they span the gap and engage portions of surface 90 of the base as indicated at 123 and provide clamping action through the ears 106.

The swivel base vise constructed as shown is not increased in peripheral size over a non-swivel base vise and only requires about a one-fourth inch increase in height.

The two section clamp with the pivoting neck and head increases the force multiplication by placing the reaction point for loading closer to the pivot lugs. Further, the neck and head member is easier to grind to proper width.

It should be noted that while a pivot pin is shown the pivot connection would not have to be pinned. The pivot may be interlocking or overlapping shoulders that engage each other along a line parallel to the pivot axis of the pivot lugs on the clamps and which rock as the clamp is tightened. For example, in FIG. 13 a clamp assembly 130 is shown having a separate head member 131 which comprises a shank and ears 132 which extend laterally from the shank. This clamp head is similar to the form used with the NC vise.

A clamp body 133 is elongated as shown and has pivot lugs 134 on opposite sides thereof. These lugs 134 fit in the recess of a T slot of a tool table as previously explained.

Loading is accomplished by using a screw to lift the remote end of the body until shoulder surface 135 causes the pivot end of the body, which is formed with an overhanging lug 136, to be urged downwardly as shown by the arrow.

The lug 136 is formed with an inclined undercut surface which has a rocker end 137. The head 131 has a lug 138 mounted on the lower end which fits under lug 136 and has an upper surface generally following the slope of the undercut surface of lug 136. The lower corner of lug 138 is rounded and the head is made so the lower end of the shank clears the surface of the slot when the clamp is placed in a table slot.

The head end of the body and the upright surface under lug 136 are cut back for clearance, and when the body rock on lugs 134, the end 137 of the lug 136 forms a pivot line to load the head downwardly. Ears 132 thus will load a vise flange against the table and will clasp it in place. The side surfaces of the vertical shank of head 131 can be ground to fit closely into a slot on a tool table. The pivot forming surfaces may be hardened if desired.

The clamp shown in FIG. 13 eliminates the need for a pin to hold the parts together and yet gives the advantage of the pivot connection. Once installed in a table slot the body and head cannot separate.

In all forms of the invention the clamp is low cost, effective and is out of the way during use.

The clamping arrangement for the NC and swivel base vise disclosed requires only one bolt or screw that has to be tightened to clamp the vises securely to the table. Conventional systems require tightening up to four clamps for locking the vise to the table and tightening the swivel base.

What is claimed is:

1. In combination, a vise body adapted to be supported on a tool table having a tool slot formed in an inverted T shape, said vise body including a recess formed into the base thereof and defined by a generally cylindrical first annular surface generated around a central axis of said body, and a second surface spaced outwardly from said first annular surface and defining an outer edge of said recess, said second surface including an inturned ledge portion formed so that the ledge portion includes a surface that faces away from a tool table on which the vise is positioned, a clamp member comprising an elongated body having a head end, a remote end, and a pair of laterally extending pivot lugs between the head end and the remote end, said pivot lugs being adapted to fit within a T slot of a tool table and being retained to cause the elongated body to pivot relative to the plane of such a table when a force is placed on the remote end of the elongated body, and head means mounted on said head end and extending upwardly through such slot and into the recess formed in the base of the vise, said head means having an overhanging surface that fits over said ledge, and means mounted on said vise body adjacent the central axis and engagable with the remote end of said clamp member to exert a force tending to move said overhanging surface of said head means against the ledge to clamp the ledge against a table on which the vise body is placed.

2. The apparatus of claim 1 and a dial assembly mounted in said recess and having means to rotatably guide said first annular surface, and means to retain said dial assembly relative to said clamp member, whereby as said clamp member is loosened the vise may be rotated on said means to guide while said dial assembly remains stationary relative to said clamp member.

3. The combination of claim 2 and including a pair of clamp members positioned to extend substantially one-hundred-eighty degrees from each other, each of said clamp members having an elongated body with the remote ends thereof adjacent said means engagable with the remote ends to exert a force.

4. The apparatus of claim 2 wherein said ledge member comprises an annular lip, and said vise body may be rotated three hundred sixty degrees relative to said clamp.

5. The apparatus of claim 2 wherein said dial assembly includes a dial plate having a formed flange member defining an opening which receives said first annular surface.

6. The apparatus of claim 2 wherein said means to retain said dial assembly relative to said clamp member includes a pair of tabs integrally formed from the dial assembly and being spaced apart a sufficient distance to receive a portion of the head of the clamp member.

7. The apparatus of claim 6 wherein said dial assembly comprises a formed plate having a pair of tabs spaced apart to receive a clamp member every ninety degrees around said plate, each pair of tabs forming a set of tabs, two first sets of tabs being spaced one-hundred-eighty degrees apart, which first sets have a first width between the tabs of each first set, and two second sets of tabs being spaced one-hundred-eighty degrees apart and offset ninety degrees from the two first sets, the tabs of the second sets being spaced apart a second different distance than the tabs of each of the first sets.

8. The apparatus of claim 2 wherein vise body has a wall adjacent the top of a table on which the vise is used and the means engagable with the remote end of the clamp body comprises a screw threaded through an opening of the lower wall and accessible from an upper side of said vise body, said screw having a head positioned to engage a portion of the remote end of the elongated body of a clamp member and move such remote end toward the vise body.

9. A vise adapted to be supported on a tool table, said vise including a vise body portion having a lower side supported on a tool table surface when in use, first guide means on said vise body portion defining an axis of rotation, and second guide means for rotatably mounting said vise body portion relative to a tool table for movement about the axis, said first and second guide means comprising interfitting annular surfaces that are concentric and adjacent each other, respectively, for guiding rotational movement of the vise body portion relative to the second guide means, and a clamp member adapted to be supported on a tool table on which the vise body portion is mounted, said clamp member being beneath the vise body portion and retaining the second guide means from rotation relative to the tool table, and having a clamp actuating member accessible from the exterior of said vise body portion whereby the lower side of said vise body portion can be selectively clamped onto an upper surface of a tool table relative to the second guide means with said clamp member at desired rotational positions about said axis.

10. The apparatus of claim 9 wherein said clamp member comprises a clamp having an elongated clamp body with a head end, a remote end, and a pair of laterally extending pivot lugs between the head end and the remote end, a head member mounted on the head end of the body clamp, the tool table on which the vise is to be mounted having a slot to pivotally mount the pivot lugs with the head member extending upwardly into the vise body portion, means formed in said vise body portion to permit said head member to engage and hold the vise body portion relative to the second guide means and such tool table when the clamp body is pivoted in a first direction, said clamp actuating member being operable to exert a force on a remote end of said clamp body to pivot said clamp body in the first direction about the laterally extending pivot lugs when in position on a tool table to clamp said head member against the vise body portion and hold the vise body portion relative to such tool table.

11. In combination, a vise body having a recess formed in the bottom surface thereof, said recess being defined in part by a first annular surface generated around an upright central axis, and a second annular surface spaced outwardly from said first annular surface and formed in part by an inturned lip defining a space above the lip on the underside of the vise body, said vise body being adapted to rest on a surface of a tool table having a T slot therein for holding the vise body relative to such tool table, and a clamp comprising an elongated body, said elongated body having a narrow transverse dimension, a pair of laterally extending pivot members on each side of said elongated body, said elongated body being adapted to fit into a T slot with the pivot members within such slot and establishing a pivot axis relative to slot surfaces generally normal to the longitudinal axis of the elongated body, a head mounted at one end of said elongated body and extending in direction outwardly from a T slot of such a tool table, means at an opposite end of said elongated body from said head to permit exerting a force on the elongated body to tend to pivot the elongated body about the pivot axis, said clamp having its head member formed to engage the upper surface of said lip opposite from the surface of the tool table with which the vise is to be used, and a screw threadably mounted in the base of the vise generally along said central axis and engaging the means at the opposite end of said elongated body, said pivot members being retained in a slot in which the clamp is placed whereby said clamp can be pivoted by said screw to move the head member against said lip to clamp the vise to such tool table.

12. The apparatus as specified in claim 9 wherein said guide means on said vise body portion comprises an annular generally upright surface defining an inner surface of a recess in the vise body portion, said recess being provided in said vise body portion on the underside thereof and having an outer edge defined by an inwardly turned ledge, said second guide means comprising a dial assembly having a flange closely fitting around said upright surface comprising said first guide means.

13. The apparatus is specified in claim 12 wherein the dial assembly includes a generally horizontal dial plate having an upwardly facing surface, and means on said vise body to permit seeing a portion of the upwardly facing surface at a reference location on the vise body.

14. The apparatus as specified in claim 12 wherein said clamp member is adapted to be mounted on a tool table with a portion of the clamp member extending into said recess, said clamp member being adapted to engage said ledge for clamping the vise body portion against a tool table on which the vise body portion and clamp member are mounted.

15. The apparatus of claim 11, wherein the head member of said clamp is mounted to said clamp body through a pivotal connection.

16. The apparatus of claim 15 wherein the head member is a separable piece having a lug extending laterally therefrom with an upwardly facing surface, the elongated clamp body having a lug with a downwardly facing surface adapted to overlie the upwardly facing surface of said lug on the head member and to form a rocking pivoting connection between the two lugs.

17. The apparatus of claim 15 wherein said pivotal connection comprises a pivot pin extending to join the head member and the elongated clamp body.

18. The apparatus of claim 11 wherein said head member is intregally formed with said elongated clamp body.

* * * * *